US012472300B2

United States Patent
Hauta-Aho (10) Patent No.: US 12,472,300 B2
(45) Date of Patent: Nov. 18, 2025

(54) SUCTION BAG FOR MEDICAL OR SURGICAL USE, AND SUCTION BAG ARRANGEMENT

(71) Applicant: SERRES OY, Kauhajoki AS (FI)

(72) Inventor: Jari Hauta-Aho, Kauhajoki AS (FI)

(73) Assignee: Serres Oy, Kauhajoki AS (FI)

( * ) Notice: Subject to any disclaimer, the term of this patent is extended or adjusted under 35 U.S.C. 154(b) by 222 days.

(21) Appl. No.: 17/598,526

(22) PCT Filed: Mar. 27, 2020

(86) PCT No.: PCT/FI2020/050200
§ 371 (c)(1),
(2) Date: Sep. 27, 2021

(87) PCT Pub. No.: WO2020/201621
PCT Pub. Date: Oct. 8, 2020

(65) Prior Publication Data
US 2022/0176030 A1    Jun. 9, 2022

(30) Foreign Application Priority Data
Mar. 29, 2019  (FI) ..................................... 20195251

(51) Int. Cl.
*A61M 1/00*    (2006.01)
(52) U.S. Cl.
CPC ......... *A61M 1/604* (2021.05); *A61M 2205/75* (2013.01)
(58) Field of Classification Search
CPC ............ A61M 2202/00; A61M 1/3689; A61M 1/3679; A61M 1/3489; A61M 1/742;
(Continued)

(56) References Cited

U.S. PATENT DOCUMENTS

2003/0178360 A1    9/2003  Haldopoulos et al.
2008/0071214 A1*   3/2008  Locke ................... F16M 13/02
                                                            604/151
(Continued)

FOREIGN PATENT DOCUMENTS

DE    10 2016 002 248    12/2016
JP        10-243998        9/1998
(Continued)

OTHER PUBLICATIONS

International Search Report and Written Opinion of the ISA for PCT/FI2020/050200, mailed Jun. 29, 2020, 10 pages.
(Continued)

*Primary Examiner* — Nicholas J. Weiss
*Assistant Examiner* — Gabriella E Burnette
(74) *Attorney, Agent, or Firm* — Nixon & Vanderhye PC (57) ABSTRACT

The present invention relates to suction bag (1) for medical or surgical use. The suction bag (1) has a connection (13) for a suction target. The suction bag (1) comprises a bag portion (3) and, fixedly connected thereto, a lid (4). The lid (4) comprises a negative pressure channel (9) for leading negative pressure suction to the suction bag, an installation recess (22) for a filter (10), surrounded with a sleeve (11), and a filter (10) installed in the installation recess (22) in connection with the negative pressure channel (9). The cross section of the sleeve (11) differs in shape from circular so that the outer diameter (d1) of its widest point is at least 0.90% larger than the outer diameter (d2) of its narrowest point.

13 Claims, 6 Drawing Sheets

(58) Field of Classification Search
CPC .... A61M 1/7413; A61M 1/7411; A61M 1/74; A61M 1/71; A61M 1/00; A61M 1/75; A61M 1/604; A61M 1/78; A61M 1/0001; B01D 2201/307; B01D 2201/30
See application file for complete search history.

(56) References Cited

U.S. PATENT DOCUMENTS

| | | |
|---|---|---|
| 2015/0141943 A1 | 5/2015 | Koch et al. |
| 2016/0257439 A1* | 9/2016 | Mäkiranta .......... B65B 69/0041 |
| 2017/0106127 A1 | 4/2017 | Chang et al. |
| 2017/0209628 A1* | 7/2017 | Mintz .................. A61M 1/782 |
| 2017/0209629 A1 | 7/2017 | Barkeley et al. |

FOREIGN PATENT DOCUMENTS

| | | |
|---|---|---|
| JP | 2016-540531 | 12/2016 |
| WO | 95/01192 | 1/1995 |

OTHER PUBLICATIONS

Search Report for FI20195251, dated Oct. 17, 2019, 2 pages.
Office Action issued on Oct. 19, 2022 in corresponding Japanese Application No. 2021-557532 (with translation), 4 pages.
Mar. 12, 2024 Office Action issued in Chinese Patent Application No. 202080024160.3, pp. 1-5 [machine translation included].

\* cited by examiner

SUCTION BAG FOR MEDICAL OR SURGICAL USE, AND SUCTION BAG ARRANGEMENT

This application is the U.S. national phase of International Application No. PCT/FI2020/050200 filed 27 Mar. 2020, which designated the U.S. and claims priority to FI Patent Application No. 20195251 filed 29 Mar. 2019, the entire contents of each of which are hereby incorporated by reference.

BACKGROUND OF THE INVENTION

The present invention relates to a suction bag for medical or surgical use. The suction bag has a connection for a suction target. The suction bag comprises a bag portion and, fixedly connected thereto, a lid which comprises a negative pressure channel for leading negative pressure suction to the suction bag, an installation recess for a filter, surrounded with a sleeve, and a filter installed in the installation recess in connection with the negative pressure channel.

A problem with the arrangement described in the above is that the passage or air through the filter is impeded if an additional filter is used in connection with diathermy, or the filter is partly blocked as a result of fluid having splashed in the filter.

BRIEF DESCRIPTION OF THE INVENTION

It is therefore an object of the invention to develop a suction bag in which the aforementioned problems have been solved. The object of the invention is achieved by a suction bag and suction bag arrangement which are characterised by what is disclosed in the independent clams. Preferred embodiments of the invention are disclosed in the dependent claims.

The suction bag according to the invention is used in connection with medical or surgical operations to suck fluid from the suction target. The suction target is usually a patient being operated on. The volume of the suction bag is often 1000 to 6000 ml. The advantage of the inventive suction bag is that air flows well also in such situations where an additional filter is used in connection with diathermy between the filter and sleeve, or when fluid being sucked has splashed onto the bottom surface of the filter.

In the following, the suction bag and suction bag arrangement are described in their operating positions.

The suction bag comprises a bag portion and a lid fixedly connected thereto. In other words, the bag portion is permanently mounted to the lid so that the bag portion and lid cannot be separated from each other without breaking the structure. The lid may be an integral piece whereby the lid, excluding the filter, is formed of the same material. Usually, the plastic material of the lid is polypropylene. The plastic material of the bag portion is usually polyethene. The lid is stiff as to its material whereas the bag portion is flexible.

The suction bag has a connection for the suction target and a connection for negative pressure. The connection for the suction target is usually realized by a so-called patient connection formed in the lid. By using the patient connection, it is however possible to suck fluid from other targets than a patient; for example, fluid that has leaked onto a floor of an operating theatre may be sucked from it. The patient connection may have on it a detachable angle connector for a patient tubing.

The connection for negative pressure in usually a channel formed at an edge of the lid, continuing inside the lid. The lid comprises a filter installation recess where the aforementioned channel joins. The installation recess had a filter through which the negative pressure acts on the inside of the suction bag and induces suction on the target being sucked through the patient connection.

The filter installed in the installation recess is substantially cylindrical. The shape of the cross section of the installation recess differs from circular. Its shape may be oblong or another shape different from circular. The installation recess is surrounded by a sleeve having another cross section than circular, the cross section of which has the diameter of the widest point and the cross section of the narrowest point. The cross section of the sleeve may be oblong or another shape differing from circular. The diameter of the cross section of the sleeve at its widest point is at least 0.90% larger than the diameter of its narrowest point. The diameter of the cross section of the sleeve at its widest point may be 3.00 to 10.00% larger than the diameter of its narrowest point, advantageously it is 4.00 to 9.00% larger than the diameter of its narrowest point, and the most advantageously 4.80 to 8.60% larger than the diameter of its narrowest point. Usually, the diameter of the widest point is at least 0.90% larger than the diameter of its narrowest point. The diameter of the cross section of the widest point may be 3.00% larger than the diameter of its narrowest point, advantageously it is at least 4.00% larger than the diameter of its narrowest point, and the most advantageously it is at least 4.80% larger than the diameter of its narrowest point. Usually, the cross section of the widest point is no more than 10.00% larger than the diameter of its narrowest point, advantageously it is no more than 9.00% larger than the diameter of its narrowest point, and the most advantageously it is no more than 8.60% larger than the diameter of its narrowest point.

The aforementioned percentages P are calculated by using the outer diameter $d1$ of the widest point of the sleeve and the outer diameter $d2$ of the narrowest point of the sleeve so that $P=((d1-d2)d2)*100$. The calculation is carried out at the precision of two decimals so that the third decimal is rounded up, if the third decimal to be omitted is 5, 6, 7, 8, or 9, and the third decimal is rounded down, if the third decimal to be omitted is 1, 2, 3, or 4. The widest diameter and narrowest diameter of the sleeve may be at any angle in relation to each other. The measurement is naturally carried out through the centre point of the filter. The diameters may be, for example, substantially perpendicular to each other, as an oblong shape requires, or the widest and narrowest diameter may be at an angle less than 90° in relation to each other.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

FIGS. 1 to 5 illustrate the same embodiment of the invention, that is, the details shown in these figures all belong to one and the same suction bag or suction bag arrangement. Some of the illustrated details are not essential, which means that they are so presented that they may be included in the structure.

The suction bag arrangement comprises a suction bag 1 and a canister 2. A bag part 3 of the suction bag 1 is installed inside the canister 2 so that a lid 4, fixedly connected to the bag part 3, closes the canister 2. The lid 4 has a groove 5 inside which the edge of the canister 2 positions itself. In the vicinity of the groove 5 there may be protrusions in the portion of the lid 4 going inside the canister 2, which prevent installing a suction bag 1 of a wrong size in the canister. An option is that there are protrusions at even intervals on the perimeter of the lid 4 going inside the canister and lid 4 contacting the wall of the canister 2.

The lid 4 of the suction bag 1 has a patient connection 13 which may have preinstalled on it an angle connector 14 of the patient connection. A hose coming from a patient and carrying fluid sucked from the patient is connected to the patient connection 13 through the angle connector 14. The patient connection 13 may also be used to convey fluid sucked from other targets to the suction bag 1. Such a target may the floor of an operating theatre, for example.

The patient connection 13 may be closed by a plug 15 of the patient connection, which is fixed to an edge of the lid 4 by a cord 16. On the side of the plug 15, which stays outside the lid 4 when the patient connection 13 is closed with the plug 15, there may be a circular groove which has ribs 17 in the direction of the radius of the plug. The ribs 17 prevent the plug 15 from being fixed directly to the angle connector 14 of the patient connection 13. The cord 16 may be toothed in its longitudinal direction whereby it is flexible and easy to bend when the patient connection 13 is to be closed by the plug 15.

The canister 4 has a negative pressure connection 6 which may have preinstalled on it an angle connector 7 of the negative pressure connection, to which the suction tube of a negative pressure source is hooked up. From the negative pressure connection 6, a negative pressure channel 8 of the canister starts, which is in contact with a negative pressure channel 9 of the suction bag 1 in the lid 4 of the suction bag and a space between the suction bag 1 and canister 2. The negative pressure acts on the inside of the suction bag 1 through a porous filter 10. The filter 10 is a cylindrical piece installed in an installation recess 22 at the mouth of the negative pressure channel 9 inside the suction bag 1. The filter 10 closes up when the fluid level reaches the bottom surface 10b of the filter 10. At this time, negative pressure suction also stops influencing.

The filter 10 is surrounded by a sleeve 11. There is a gap 12 between the inner wall of the sleeve 11 and outer surface of the filter 10, in which gap an additional filter may be installed. The shape of the cross section of the sleeve 11 differs from circular. The shape differing from circular contributes to good air passage in special situations, too, such as in connection with the use of an additional filter, or when the filter 10 is partly clogged even though the suction bag 1 is not yet full. In other words, negative pressure suction works normally regardless of the special situation because the shape of the cross section of the sleeve 11, which differs from circular, leaves room for air to flow between the cylindrical filter 10 and sleeve 11.

The diameter of the cross section of the sleeve 11 at its widest point is at least 0.90% larger than the diameter of its narrowest point. The diameter of the cross section of the sleeve at its widest point may be 3.00 to 10.00% larger than the diameter of its narrowest point, advantageously it is 4.00 to 9.00% larger than the diameter of its narrowest point, and the most advantageously 4.80 to 8.60% larger than the diameter of its narrowest point. Usually, the diameter of the widest point is at least 0.90% larger than the diameter of its narrowest point. The diameter of the widest point may be 3.00% larger than the diameter of its narrowest point, advantageously it is at least 4.00% larger than the diameter of its narrowest point, and the most advantageously it is at least 4.80% larger than the diameter of its narrowest point. Usually, the cross section of the widest point is no more than 10.00% larger than the diameter of its narrowest point, advantageously it is no more than 9.00% larger than the diameter of its narrowest point, and the most advantageously it is no more than 8.60% larger than the diameter of its narrowest point.

The sleeve 11 is measured on the side of its outer surface. Because the material thickness of the sleeve 11 is substantially invariable, the measurement provides reliable information also on the widest and narrowest diameter of the inner surface of the sleeve 11.

The lid 4 may have a series connection 20 which may be closed by a plug 21 of the series connection. The series connection 20 may be used to connect suction bags in series, for sampling, dosage of a solidifier, and manual emptying.

The lid 4 may also have a place 23 for attaching an accessory. Furthermore, the lid 4 may have markings on it for installing the suction bag 1 to the canister 2 so that the suction bag 1 can be correctly and easily installed in place.

When the suction bag 1 is removed from the canister 2, the suction bag 1 may have a removal rib 18. The removal rib 18 is turned upwards so that protrusions 19 at the base of the removal rib 18 support themselves on the edge of the lid 4, whereby the edge of the lid 4 rises to some extent, and air from outside the canister 2 may flow into the canister 2.

Figure 1:
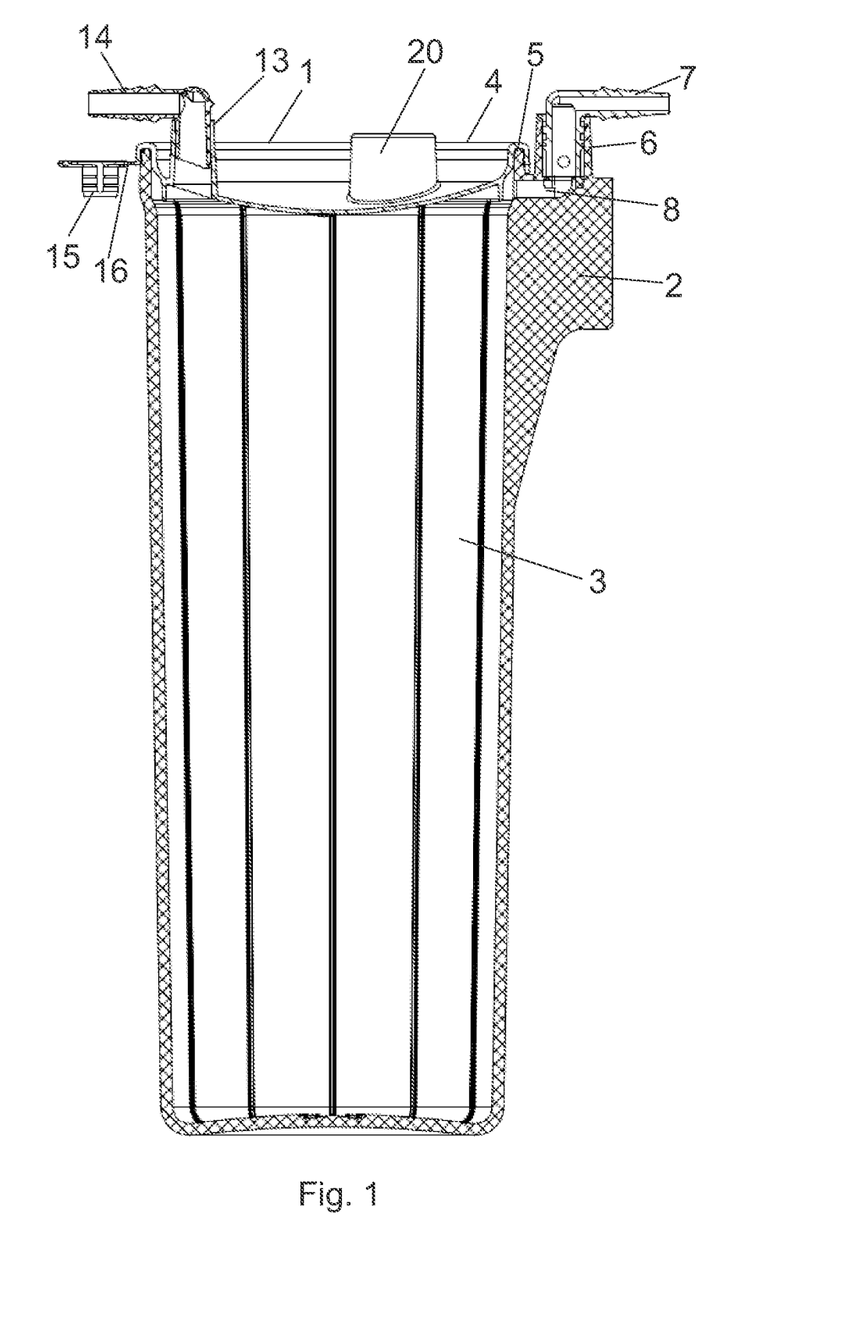
FIGS. 1 and 2 show cross sections of a suction bag and canister.
Figure 2:
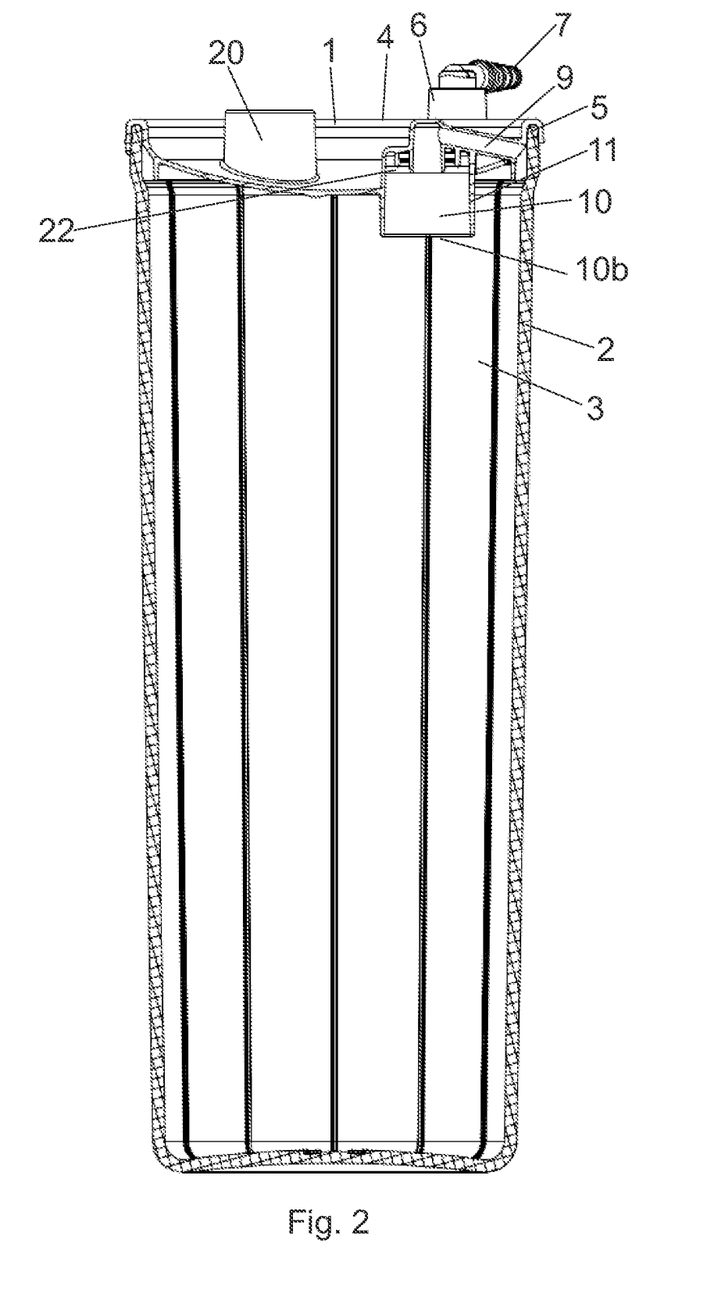
Figure 3:
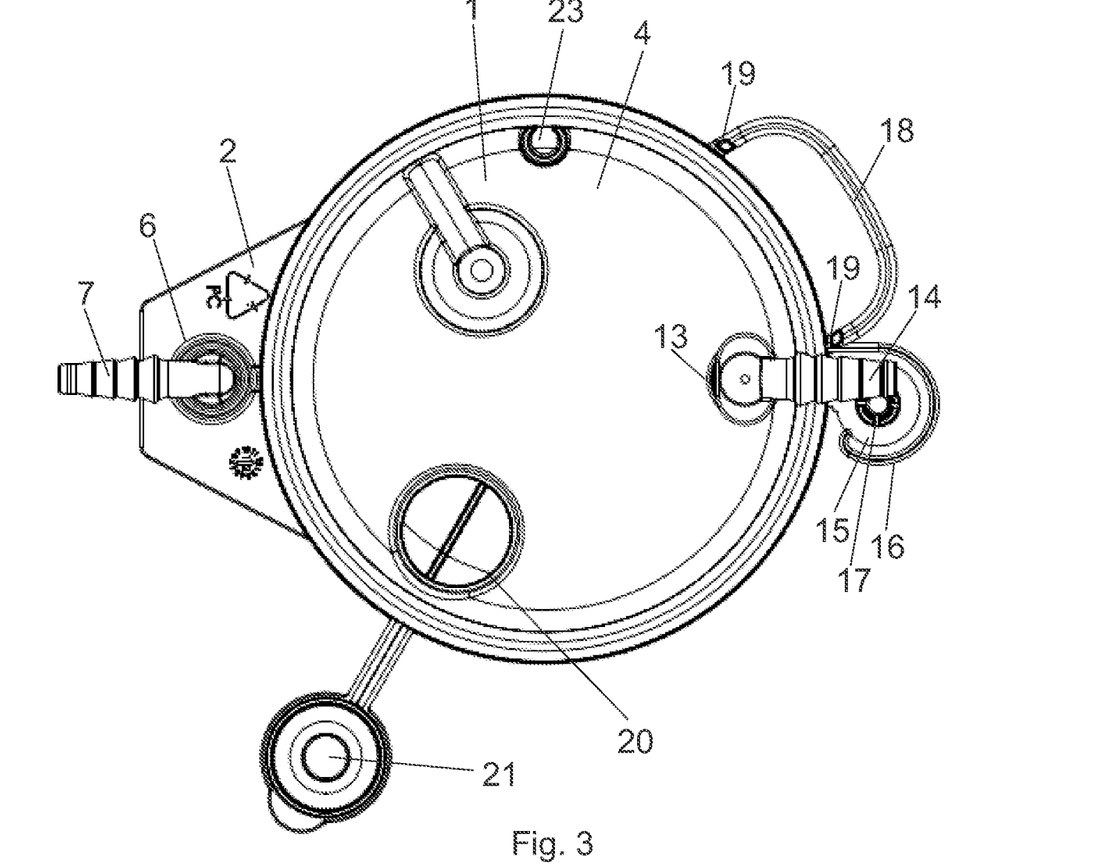
FIG. 3 is a top view of the suction bag and canister.
Figure 4:
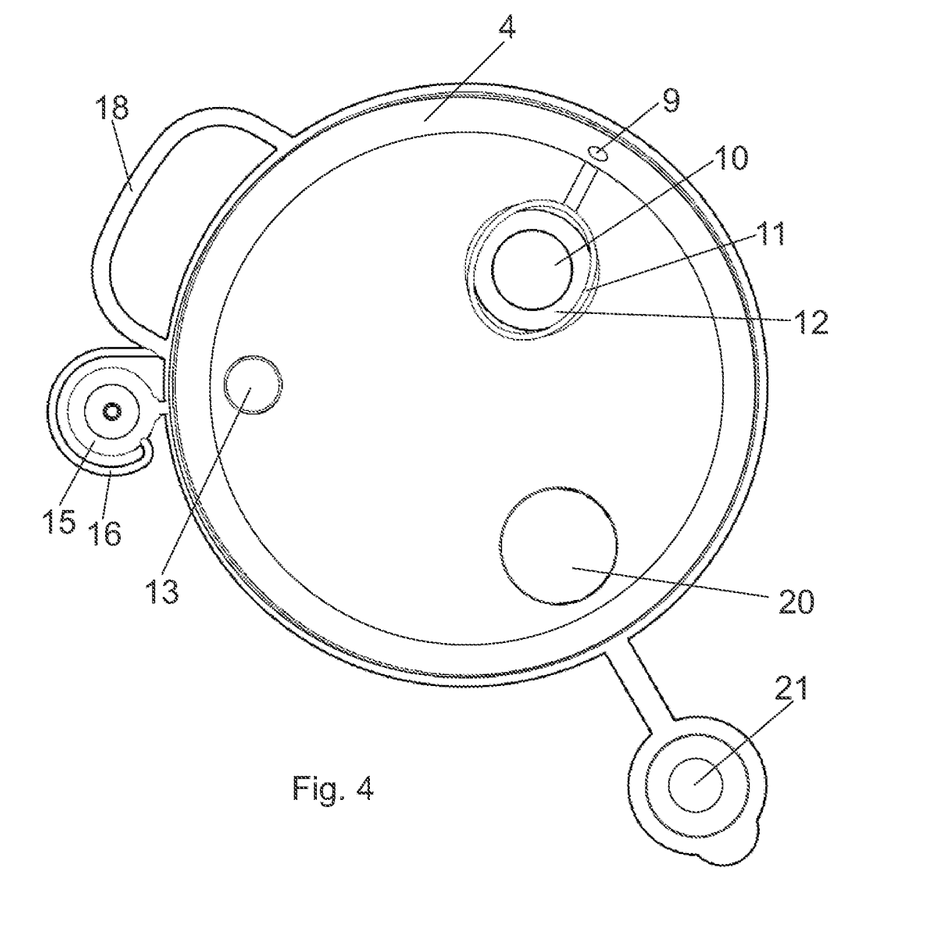
FIG. 4 shows a lid of the suction bag as seen from below.
Figure 5:
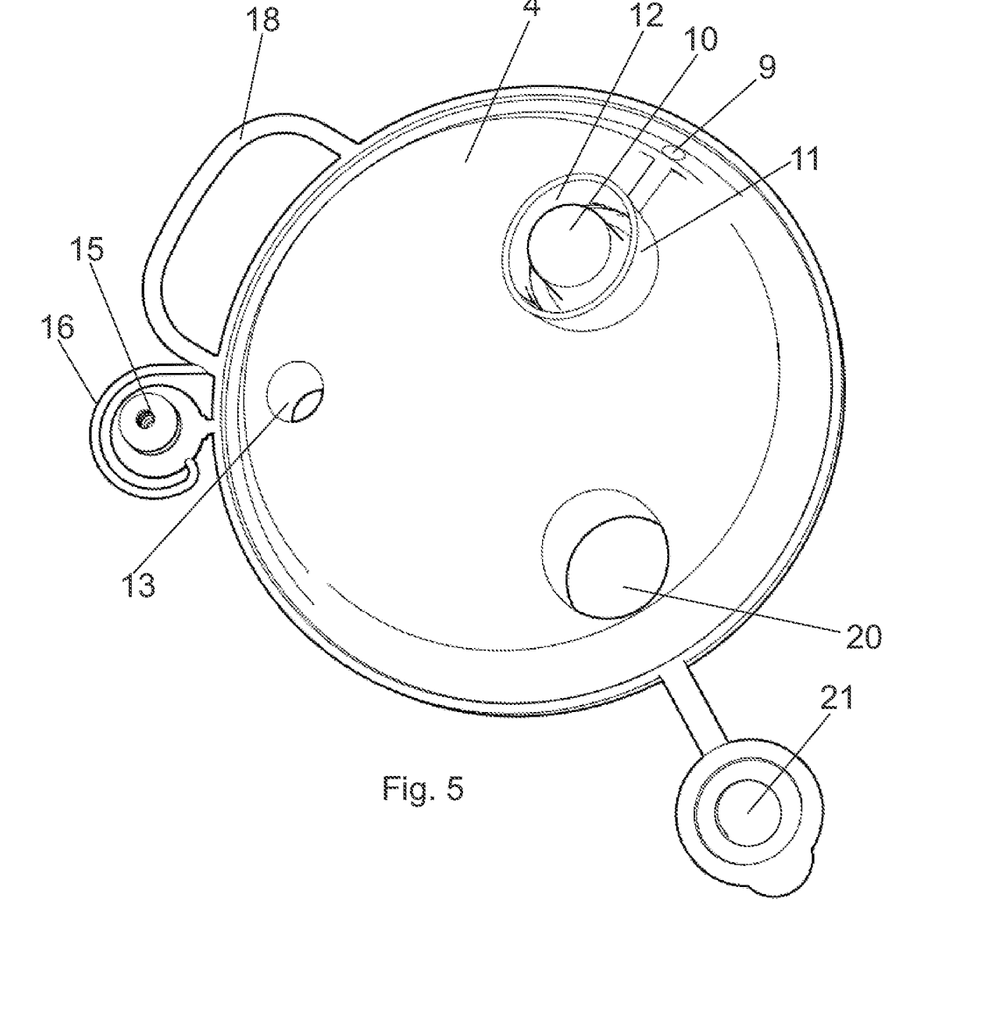
FIG. 5 is a perspective view of the lid of the suction bag as seen obliquely from below.
Figure 6:
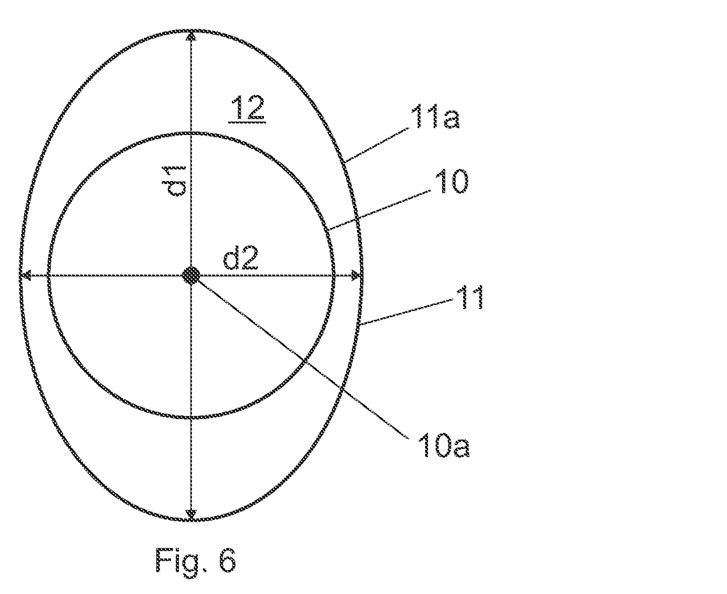
FIGS. 6 and 7 show possible cross sectional shapes of a sleeve.
Figure 7:
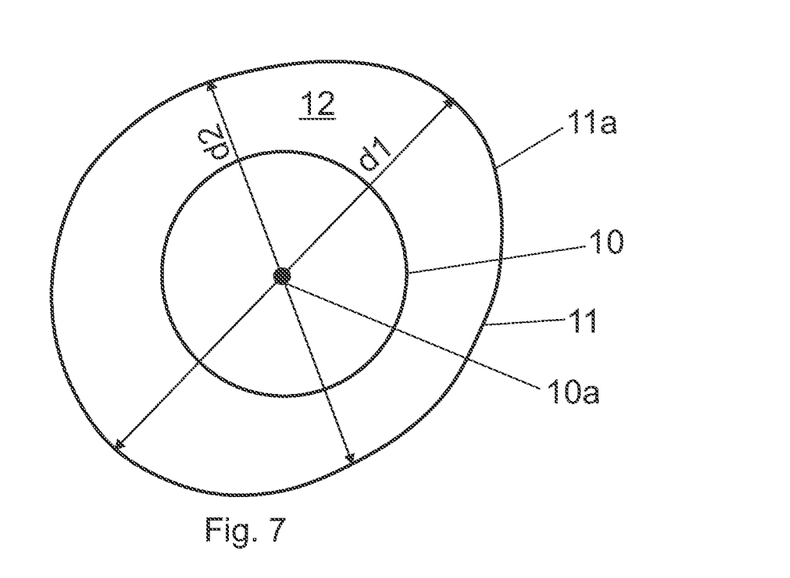

FIGS. 6 and 7 illustrate measuring the widest diameter d1 and narrowest diameter d2 of the sleeve 11. In FIG. 6, the cross section of the sleeve 11 is an ellipse, whereby the widest diameter d1 and narrowest diameter d2 are perpendicular to each other. The measurement is carried out on the external surface 11a of the sleeve. The diameters d1 and d2 pass through the centre point 10a of the filter 10. A gap 12 remains between the outer surface of the filter 10 and inner surface of the sleeve 11.

In FIG. 7, the cross section of the sleeve 11 is geometrically irregular whereby the widest diameter d1 and narrowest diameter d2 are at an angle less than 90° in relation to each other. The measurement is carried out on the external surface 11a of the sleeve. The diameters d1 and d2 pass through the centre point 10a of the filter 10. A gap 12 remains between the outer surface of the filter 10 and inner surface of the sleeve 11.

Those skilled in the art will find it obvious that, as technology advances, the basic idea of the invention may be implemented in many different ways. The invention and its embodiments are thus not limited to what is described in the above but they may vary within the scope of the claims.

The invention claimed is:

1. A suction bag for medical or surgical use, the suction bag comprising:
 a bag portion and, fixedly connected thereto, a lid that has a top side, an underside, and a circular edge,
 wherein the lid comprises a connection for a suction target on the top side of the lid, an installation recess and a sleeve opening to the underside of the lid, and an open end of a negative pressure channel on the circular edge of the lid so that the negative pressure channel that is configured to lead negative pressure suction to the suction bag extends inside the lid from the open end to the installation recess, wherein a cylindrical filter resides in the installation recess that is surrounded by the sleeve that protrudes from the underside of the lid towards the bag portion, and wherein the cross section of the sleeve differs in shape from circular so that the outer diameter of its widest point is at least 0.90% larger than the outer diameter of its narrowest point and the outer diameter of the widest point of the sleeve is no more than 10.00% larger than the outer diameter of its narrowest point.

2. A suction bag as claimed in claim 1, wherein the outer diameter of the widest point of the sleeve is at least 3.00% larger than the outer diameter of its narrowest point.

3. A suction bag as claimed in claim 1, wherein the outer diameter of the widest point of the sleeve is at least 4.00% larger than the outer diameter of its narrowest point.

4. A suction bag as claimed in claim 1, wherein the outer diameter of the widest point of the sleeve is at least 4.80% larger than the outer diameter of its narrowest point.

5. A suction bag as claimed in claim 1, wherein the outer diameter of the widest point of the sleeve is no more than 9.00% larger than the outer diameter of its narrowest point.

6. A suction bag as claimed in claim 1, wherein the outer diameter of the widest point of the sleeve is no more than 8.60% larger than the outer diameter of its narrowest point.

7. A suction bag arrangement comprising a canister and the suction bag as claimed in claim 1, the suction bag being installed within the canister.

8. A suction bag for medical or surgical use, the suction bag comprising:

a bag portion and, fixedly connected thereto, a lid that has a top side, an underside and a circular edge;

wherein the lid comprises a connection for a suction target on the top side of the lid, an installation recess and a sleeve opening to the underside of the lid, and an open end of a negative pressure channel on the circular edge of the lid so that the negative pressure channel that is configured to lead negative pressure suction to the suction bag extends inside the lid from the open end to the installation recess;

wherein a cylindrical filter resides in the installation recess that is surrounded by a sleeve that protrudes from the underside of the lid towards the bag portion; and wherein the cross section of the sleeve is geometrically irregular so that the outer diameter of its widest point is at least 0.90% larger than the outer diameter of its narrowest point and the outer diameter of the widest point of the sleeve is no more than 10.00% larger than the outer diameter of its narrowest point.

9. A suction bag as claimed in claim 8, wherein the outer diameter of the widest point of the sleeve is at least 3.00% larger than the outer diameter of its narrowest point.

10. A suction bag as claimed in claim 8, wherein the outer diameter of the widest point of the sleeve is at least 4.00% larger than the outer diameter of its narrowest point.

11. A suction bag as claimed in claim 8, wherein the outer diameter of the widest point of the sleeve is at least 4.80% larger than the outer diameter of its narrowest point.

12. A suction bag as claimed in claim 8, wherein the outer diameter of the widest point of the sleeve is no more than 9.00% larger than the outer diameter of its narrowest point.

13. A suction bag as claimed in claim 8, wherein the outer diameter of the widest point of the sleeve is no more than 8.60% larger than the outer diameter of its narrowest point.

\* \* \* \* \*